Jan. 27, 1931.  W. L. DODGE  1,790,412
MEANS FOR OPERATING CURTAINS
Filed Feb. 1, 1928

Inventor.
William L. Dodge
by Heard Smith & Tennant.
Attys.

Patented Jan. 27, 1931

1,790,412

UNITED STATES PATENT OFFICE

WILLIAM L. DODGE, OF DOVER, NEW HAMPSHIRE

MEANS FOR OPERATING CURTAINS

Application filed February 1, 1928. Serial No. 251,097.

This invention relates to means for operating curtains and has for its object to provide a novel curtain-operating device by which a curtain may be operated from a point remote from the curtain.

A device embodying the invention is useful in various places where a curtain is necessary and where it is often desirable to be able to operate the curtain from a remote point. Merely as illustrating one application of the invention I would refer to the curtain at the rear window of an automobile.

In driving an automobile at night the driver is often annoyed by the headlights of an automobile in the rear which shine through the rear window of the automobile and are reflected by the rear vision mirror into the eyes of the driver. Sometimes this reflection will be of such a glaring nature as to materially interfere with the vision of the driver. This annoyance can be eliminated by drawing down the back curtain so as to shut out the headlights from the car in the rear. If the back seat of the automobile has an occupant then the curtain can be readily drawn but if the driver is alone in the car he is not able to draw down the back curtain without stopping his car.

By my invention I have provided a novel means by which the rear curtain of the automobile can be raised or lowered by a person occupying the front seat and thus if a person who is driving alone finds that his vision is interfered with by the headlights of an automobile in the rear he can readily lower the rear curtain while still sitting in the front seat and operating the car.

I propose to secure this object by connecting a flexible shaft to the curtain roll which will extend to an operating device within convenient reach of an occupant of the front seat.

In order to give an understanding of the invention I have illustrated in the drawings a selected embodiment thereof which will now be described after which the novel features will be pointed out in the appended claims.

Figure 1:
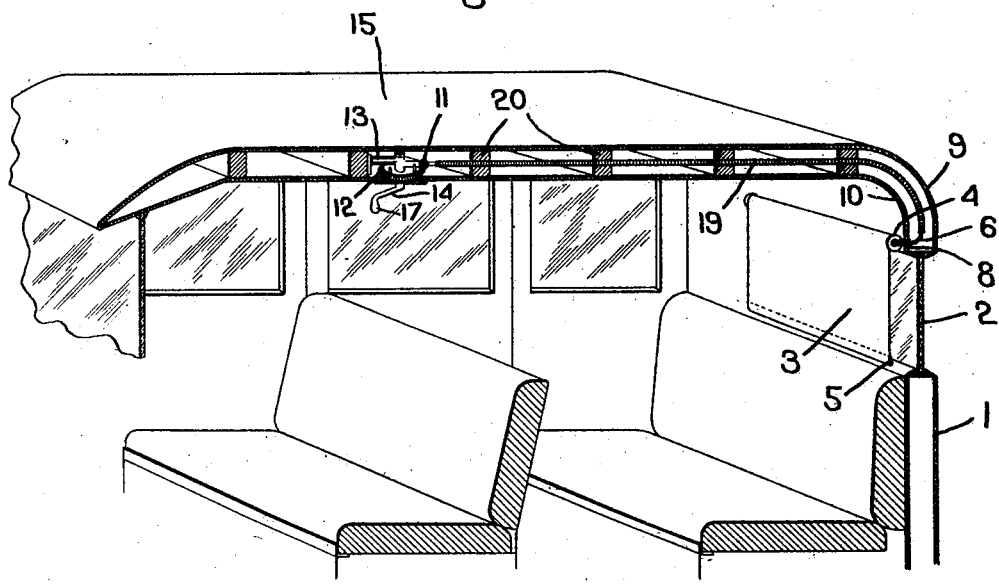
Fig. 1 is a partial perspective view of an automobile equipped with my improvements.
Figure 2:
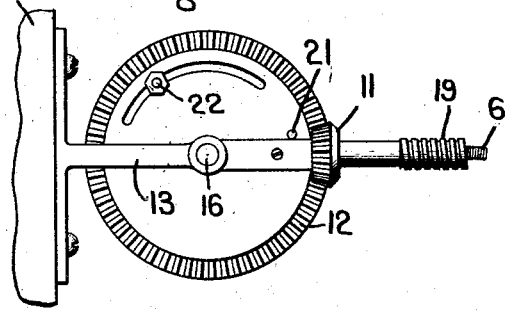
Fig. 2 is a top plan view of the operating mechanism.
Figure 4:
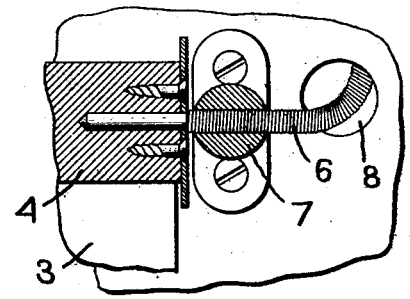
Fig. 4 is a sectional view showing the manner of connecting the flexible shaft to the curtain roll.
Figure 3:
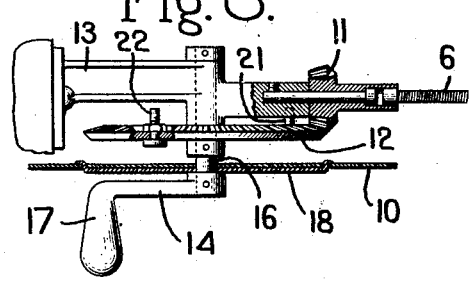
Fig. 3 is a side view of Fig. 2.

In the drawings 1 indicates generally an automobile which is provided with the usual rear window 2, the latter being equipped with a curtain 3 which may be raised and lowered. The curtain is shown as wound on a curtain roll 4 as usual.

In my present invention I connect to the curtain roll a flexible shaft which extends from the curtain roll to the point from which it is desired to operate the curtain and I also provide an operating device at such point by which the shaft may be turned in either direction. The flexible shaft is connected directly to the curtain roll 4 without the interposition of pawls so that the turning of the shaft in one direction will rotate the roll in a direction to unwind the curtain while rotation of the shaft in the other direction will rotate the roll in a direction to roll up the curtain.

The curtain will be preferably provided at its lower edge with the usual stick 5 which is of sufficient weight so that when the curtain roll 4 is turned in a direction to unwind the curtain the weight of the stick will cause the curtain to be lowered.

The flexible shaft by which the curtain is operated is shown at 6 and at one end it is rigidly secured to the curtain roll as stated above. The flexible shaft 6 is of the usual coil spring variety and it is rigidly secured to the curtain roll through the medium of a pin 30 which is situated axially of the roll and is rigid therewith, said pin extending into the end of the flexible shaft 6 and also being rigidly secured to said shaft. Said shaft is shown as extending through one of the bearings 7 for the curtain and it extends to the point from which the curtain is to be operated. In the case of an automobile I will preferably run the shaft in the space between the outside covering of the automobile body and the inside lining so that the shaft will be concealed. As herein illustrated this flexible shaft extends through an opening 8 in the window frame and then extends between the outer shell 9 of the automobile body and the lining 10 to a point within reach of an occupant of the front seat.

Any suitable operating device may be employed for actuating the shaft 6. In the construction herein shown the shaft 6 has a bevelled gear 11 fast thereon at one end which meshes with an operating gear 12, both the bevelled gear and the operating gear being journalled in a suitable bracket 13 which is secured to the framing of the car. The operating gear 12 is shown as having a crank handle 14 by which it may be turned.

I will preferably place the bracket 13 with the gears mounted thereon in the top of the car between the roof 15 and the lining 10 so that the gears will be concealed from view and the crank handle 14 only will be exposed to view. This crank handle is shown as having the stem portion 16 which is situated axially of the operating gear 12 and the crank handle 17.

In order to provide a neat finish I may employ a disk 18 which is secured to the top of the car and through which the stem 16 of the crank handle extends.

Under some circumstances it may be desirable to enclose the flexible shaft 6 in a flexible tube 19 which will not only protect the shaft but will also prevent it from contacting with either the lining or the other parts of the automobile. If any of the roof timbers 20 of the automobile are in line of the shaft I will preferably provide such timbers with openings through which the flexible tube 19 may extend. If the device is installed in the automobile when the body is built then the shaft can be so placed as to be entirely concealed from view.

I will preferably provide the operating mechanism with a suitable stop to limit the turning movement of the handle 14 when the curtain is either completely raised or completely lowered. One convenient way is to make the ratio of the gears 11 and 12 such that one rotation or less of the operating gear 12 will be sufficient to completely lower or completely raise the curtain. This gear is shown as provided with two stop members 21 and 22 which are adapted by their engagement with the bracket arm 13 to limit the turning movement of the operating gear in either direction.

The stop member 22 is shown as being adjustably secured to the operating gear so that the amount of turning movement permitted the gear can be varied to suit the length of the curtain. In some automobiles the rear window is of less vertical dimension than in other automobiles and by having one of the stops adjustable it is possible to so adjust the operating mechanism that the movement which is permitted to the operating gear will be just sufficient to completely raise or lower the curtain. With this construction the operation of lowering the curtain from its fully raised position involves merely turning the handle 14 from the position as determined by one stop to that as determined by the other stop while a reverse movement of the handle will, of course, raise the curtain.

Although I have illustrated the invention as applied to a rear curtain for an automobile I do not wish to be limited to this use nor to the precise construction illustrated as it will be obvious that the invention is capable of being used in other relations and that various changes may be made in the constructional details without departing from the invention.

I claim:

1. The combination with a curtain roll adapted to be located above the rear window of an automobile and on which a curtain may be wound, of a flexible shaft rigidly connected to said curtain roll axially thereof and extending to a point within reach of an occupant of the front seat of the automobile and situated between the outer wall of the automobile body and the lining thereof, a supporting bracket, a gear journalled thereon and fast to said shaft, an operating gear journalled on the bracket and meshing with the first-named gear, said bracket being concealed between the lining and the roof of the automobile, and a crank handle connected to said operating gear and projecting through the lining, whereby an occupant of the front seat can raise and lower the curtain by manipulating the crank handle.

2. The combination with a curtain roll adapted to be located above the rear window of an automobile, of a flexible shaft rigidly connected at one end to the end of the roll axially thereof, said shaft extending to a point remote from the curtain roll but non-axially therewith and means at the end of the shaft for operating the latter.

3. In a curtain-operating device, the combination with a curtain roll, of a flexible shaft rigidly connected at one end to the end of the roll axially thereof and extending to a point remote from the curtain, a bearing for the end of the roll, said flexible shaft extending through said bearing and the portion of the shaft adjacent the roll constituting a supporting trunnion for the roll.

4. The combination with a curtain roll, of a flexible shaft rigidly connected to said curtain roll axially thereof and extending to a point remote from said roll but situated non-axially therewith, a supporting bracket, a gear journalled thereon and fastened to said shaft, an operating gear journalled on the bracket and meshing with the first-named gear, a crank handle connected to said operating gear, and stops carried by said operating gear and cooperating with the bracket to limit the turning movement of said gear in each direction.

5. The combination of a curtain roll adapted to be located above the rear window of an automobile, a flexible shaft rigidly connected at one end to the end of the roll axially thereof, said shaft extending to a point remote from the curtain roll but non-axially therewith and means at the end of the shaft for operating the latter.

6. In a curtain-operating device, the combination of a curtain roll, a flexible shaft rigidly connected at one end to the end of the roll axially thereof and extending to a point remote from the curtain, a bearing for the end of the roll, said flexible shaft extending through said bearing and the portion of the shaft adjacent the roll constituting a supporting trunnion for the roll.

7. An automobile rear-curtain operating-device comprising in combination a rear-window curtain-roller, a flexible drive shaft, a coupling between one end of said shaft and said roller, manually-operated means for actuating said shaft connected to the opposite end thereof and located within convenient reach of the driver, and variable, adjustable means for limiting the amount of rotation of said curtain roller.

8. An automobile rear-curtain operating-device comprising in combination a rear-window curtain-roller, a flexible drive shaft, a coupling between one end of said shaft and said roller gearing at the other end of said shaft for imparting rotation thereto, manually-operated means for actuating said gearing located within convenient reach of the driver, and variable adjustable means for limiting the amount of rotation of said curtain roller.

9. An automobile rear-curtain operating-device comprising in combination a rear-window curtain-roller, manually-operated means located within convenient reach of the driver for actuating said curtain roller, and variable, adjustable means for limiting the amount of rotation of said curtain roller.

In testimony whereof, I have signed my name to this specification.

WILLIAM L. DODGE.